(12) United States Patent
Brumbaugh (10) Patent No.: US 6,804,609 B1
(45) Date of Patent: Oct. 12, 2004

(54) PROPERTY PREDICTION USING RESIDUAL STEPWISE REGRESSION

(75) Inventor: David L. Brumbaugh, Bartsville, OK (US)

(73) Assignee: ConocoPhillips Company, Houston, TX (US)

(*) Notice: Subject to any disclaimer, the term of this patent is extended or adjusted under 35 U.S.C. 154(b) by 0 days.

(21) Appl. No.: 10/412,995

(22) Filed: Apr. 14, 2003

(51) Int. Cl.[7] ............................................. G01V 1/28
(52) U.S. Cl. ................................... 702/14; 702/13
(58) Field of Search ......................... 702/11, 12, 13, 702/14, 16

(56) References Cited

U.S. PATENT DOCUMENTS

| | | | |
|---|---|---|---|
| 4,817,062 A | * 3/1989 | De Buyl et al. | ............ 367/73 |
| 5,691,958 A | 11/1997 | Calvert et al. | |
| 5,808,966 A | 9/1998 | Calvert et al. | |
| 5,838,634 A | * 11/1998 | Jones et al. | ............ 367/73 |
| 5,848,379 A | 12/1998 | Bishop | |
| 6,226,596 B1 | 5/2001 | Gao | |
| 6,236,943 B1 | * 5/2001 | Aminzadeh et al. | ............ 702/16 |
| 6,374,185 B1 | 4/2002 | Taner et al. | |
| 6,389,361 B1 | * 5/2002 | Geiser | ............ 702/15 |

OTHER PUBLICATIONS

Hampson, Daniel P. et al. "Use of multiattribute transforms to predict log properties from seismic data." *Geophysics* vol. 66 No. 1 (Jan.–Feb. 2001):220–236.

Kim, Chul–Sung. "Reliability measures for statistical prediction of geophysical and geological parameters in geophysical prospecting." U.S. patent application No. 2001/0044698 (Nov. 2001). Houston, TX.

* cited by examiner

*Primary Examiner*—Donald McElheny, Jr.
(74) *Attorney, Agent, or Firm*—Kameron D. Kelly; Ryan N. Cross (57) ABSTRACT

A method for predicting reservoir properties at an unexplored subterranean location based on known seismic attributes at the unexplored subterranean location, as well as known reservoir properties and seismic attributes at a plurality of explored subterranean locations proximate to the unexplored subterranean locations. The method uses residual stepwise regression to generate a prediction equation capable of calculating predicted reservoir properties based on multiple seismic attributes. The residual stepwise regression involves using residual values from a previous regression step to determine which seismic attribute will be included in a subsequent regression step.

41 Claims, 5 Drawing Sheets

PROPERTY PREDICTION USING RESIDUAL STEPWISE REGRESSION

BACKGROUND OF THE INVENTION

1. Field of the Invention

The present invention relates generally to methods for using seismic data to predict reservoir properties at unexplored subterranean locations. In another aspect, the invention relates to a method for predicting reservoir properties at unexplored subterranean locations based on known reservoir properties at explored subterranean locations and seismic attributes generated from a seismic survey or surveys encompassing both the explored and unexplored subterranean locations.

2. Description of the Prior Art

Seismic surveys gather important information about the subsurface of the earth. Data gathered from a seismic survey is typically manipulated to yield a pool of unique seismic attributes. Seismic attributes can be defined as analytical measurements of the seismic expression of geologic conditions and can take a variety of forms. Frequently, seismic attributes are measurements of a seismic waveform's amplitude, length, area, symmetry, frequency, or phase. In addition, seismic attributes may be discrete classifications (e.g., pattern assignments or facies), structural (time or depth horizons, isochrons, or isopachs), and spatial coordinates (e.g., X-coordinate and Y-coordinate). Each seismic attribute responds to particular reservoir conditions in a unique manner. Thus, seismic attributes can be used to predict reservoir properties (e.g., porosity, thickness, or fluid type) of the subterranean formation. By using multiple seismic attributes for reservoir property prediction, noise contamination may be reduced and accuracy of the prediction may be enhanced.

A number of conventional methods exist for using multiple seismic attributes to predict reservoir properties of a subterranean formation. When known reservoir properties (typically from well logs) are available at locations within the surveyed region, those known reservoir properties can be used to help "calibrate" the seismic attributes. A variety of methods exist for calibrating seismic attributes with known reservoir properties in an effort to more accurately predict reservoir properties at unexplored locations. One conventional calibration method performs calculations for all possible combinations of the seismic attributes. Such an exhaustive approach is very computationally intensive and can require long periods of time and expensive computers to achieve. Another conventional calibration method involves selecting a pre-identified group of the seismic attributes to use in the calculation. However, one can never be sure that the pre-selected seismic attributes provide the best solution. Still another conventional calibration method progressively adds seismic attributes to a predetermined starting attribute. This method, however, can result in a local answer which is not the optimal global solution.

Typically, the above-described conventional techniques each yield a multi-variable prediction equation that can be employed to calculate a predicted reservoir property at a certain unexplored location based on multiple seismic attributes at that location. However, there is currently no procedure for quantitatively determining the relative contribution of each seismic attribute used in the prediction equation. Such a procedure for quantitatively determining the predictive significance of each seismic attribute would be helpful for selecting which seismic attributes to extract from seismic survey data for future property predictions.

OBJECTS AND SUMMARY OF THE INVENTION

It is therefore an object of the present invention to provide a computationally efficient method of predicting reservoir properties using multiple seismic attributes.

Another object of the present invention is to provide a more accurate method of predicting reservoir properties using multiple seismic attributes that avoids providing a local solution.

Still another object of the present invention is to provide a quantitative method of determining the relative significance of individual attributes used as variables in multivariable prediction equations.

It should be understood that the above-listed objects are only exemplary, and not all the objects listed above need be accomplished by the invention described and claimed herein.

In one embodiment of the present invention, there is provided a method of predicting a reservoir property at an unexplored subterranean location based on a seismic attribute pool generated from a seismic survey and known reservoir properties at explored subterranean locations. The seismic attribute pool includes a plurality of common seismic attributes for each explored and unexplored location. The property prediction method comprises the steps of: (a) performing a first regression of the known reservoir properties and a first one of the common seismic attributes at the explored locations, with the regression yielding a first prediction equation for calculating a first predicted reservoir property; (b) calculating first residuals for the known reservoir properties and corresponding first predicted reservoir properties generated with the first prediction equation; (c) correlating the first residuals with the common seismic attributes not used in the regression of step (a); and (d) selecting the common seismic attribute with the highest correlation from step (c) as a second one of the common seismic attributes.

In another embodiment of the present invention, there is provided a stepwise regression method for predicting a reservoir property at an unexplored subterranean location based on a seismic attribute pool generated from a seismic survey and known reservoir properties at explored subterranean locations. The seismic attribute pool includes a plurality of common seismic attributes for each explored and unexplored location. The stepwise cumulative regression method comprises the steps of: (a) selecting one of the common seismic attributes as a current starting attribute and proceeding to step (b); (b) adding the selected seismic attribute from the previous step to a cumulative attribute set and proceeding to step (c); (c) performing a regression of the known reservoir properties and the seismic attribute or attributes in the cumulative attribute set, to thereby yield a current prediction equation for calculating a predicted reservoir property and proceeding to step (d); (d) calculating a current correlation value, a current prediction error and current residuals for the known reservoir properties and corresponding predicted reservoir properties generated with the current prediction equation and proceeding to step (e); (e) proceeding to step (g) if the selected seismic attribute from step (b) is the starting seismic attribute, otherwise comparing the current correlation value and prediction error to a prior correlation value and prediction error and proceeding to step (f); (f) proceeding to step (j) if the current correlation value or prediction error is worse than the prior correlation value and prediction error, otherwise proceeding to step (g); (g) correlating the residuals from step (d) with each of the common seismic attributes not currently in the cumulative attribute data set and proceeding to step (h); (h) designating the current prediction equation, correlation value, and prediction error as a prior prediction equation, correlation value, and prediction error and proceeding to step (i); (i) selecting the seismic attribute with the highest correlation from step (g) as a next seismic attribute and returning to step (b); and (j) designating the prior prediction equation as an optimum prediction equation for the current starting attribute.

In still another embodiment of the present invention, there is provided a method of predicting a reservoir property at an unexplored subterranean location based on a seismic attribute pool generated from a seismic survey and known reservoir properties at explored subterranean locations. The seismic attribute pool includes a plurality of common seismic attributes for each explored and unexplored location. The prediction method comprises the steps of: (a) correlating the known reservoir properties with the common seismic attributes to yield a correlation value that is proportional to the degree of correlation between the known reservoir properties and the common seismic attributes; (b) selecting several of the common seismic attributes with the highest correlation values as possible starting attributes; (c) determining a prediction equation for each possible starting attribute, each of said prediction equations having a correlation value and prediction error associated therewith; and (d) selecting an optimum prediction equation from the prediction equations determined in step (c) based on the correlation value and prediction error of the prediction equations determined in step (c).

In yet another embodiment of the present invention, there is provided a method comprising the steps of: (a) extracting actual well data from a plurality of subterranean well locations, the well data including a target reservoir property for each well location; (b) generating seismic data from a seismic survey of a subterranean region of interest that includes the subterranean well locations, with the seismic data including a plurality of seismic attributes for each well location; (c) selecting an unexplored location in the subterranean region of interest, with the unexplored location being spaced from the well locations; (d) correlating the target reservoir properties with the seismic attributes to yield a correlation value that is proportional to the degree of correlation between the target reservoir properties and the seismic attributes; (e) selecting several of the seismic attributes with the highest correlation values as possible starting attributes; (f) determining a prediction equation for each possible starting attribute, each of the prediction equations having a correlation value and prediction error associated therewith; and (g) selecting an optimum prediction equation from the prediction equations determined in step (f) based on the correlation value and prediction error of the prediction equations; and (h) using the optimum prediction equation to calculate a predicted reservoir property at the unexplored location based on the seismic attributes at the unexplored location.

In a further embodiment of the present invention, there is provided a method of determining the relative significance of multiple seismic attributes used to predict a reservoir property. The method comprises the steps of: (a) normalizing each of the seismic attributes; (b) generating a reservoir property prediction equation via regression of the multiple seismic attributes and actual reservoir properties, the prediction equation being operable to calculate a predicted reservoir property based on the value of the seismic attributes plugged into the prediction equation, the prediction equation including a coefficient associated with each normalized seismic attribute; and (c) dividing the coefficient for each normalized seismic attribute by the sum of the absolute values of all the coefficients used in the prediction equation.

In a still further embodiment of the present invention, there is provided a method of determining the relative significance of multiple seismic attributes used as variables in a reservoir property prediction equation. The prediction equation is operable to calculate a predicted reservoir property based on the values of the seismic attributes plugged into the prediction equation. The prediction equation includes a coefficient associated with each seismic attribute. The method comprises the steps of: (a) determining a standard deviation for each seismic attribute used in the prediction equation; (b) multiplying the standard deviation for each seismic attribute by the coefficient for that respective seismic attribute to yield a modified coefficient for each seismic attribute; and (c) dividing the modified coefficient for each seismic attribute by the sum of the absolute values of all the modified coefficients for all the seismic attributes used in the prediction equation.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENT

Figure 1:
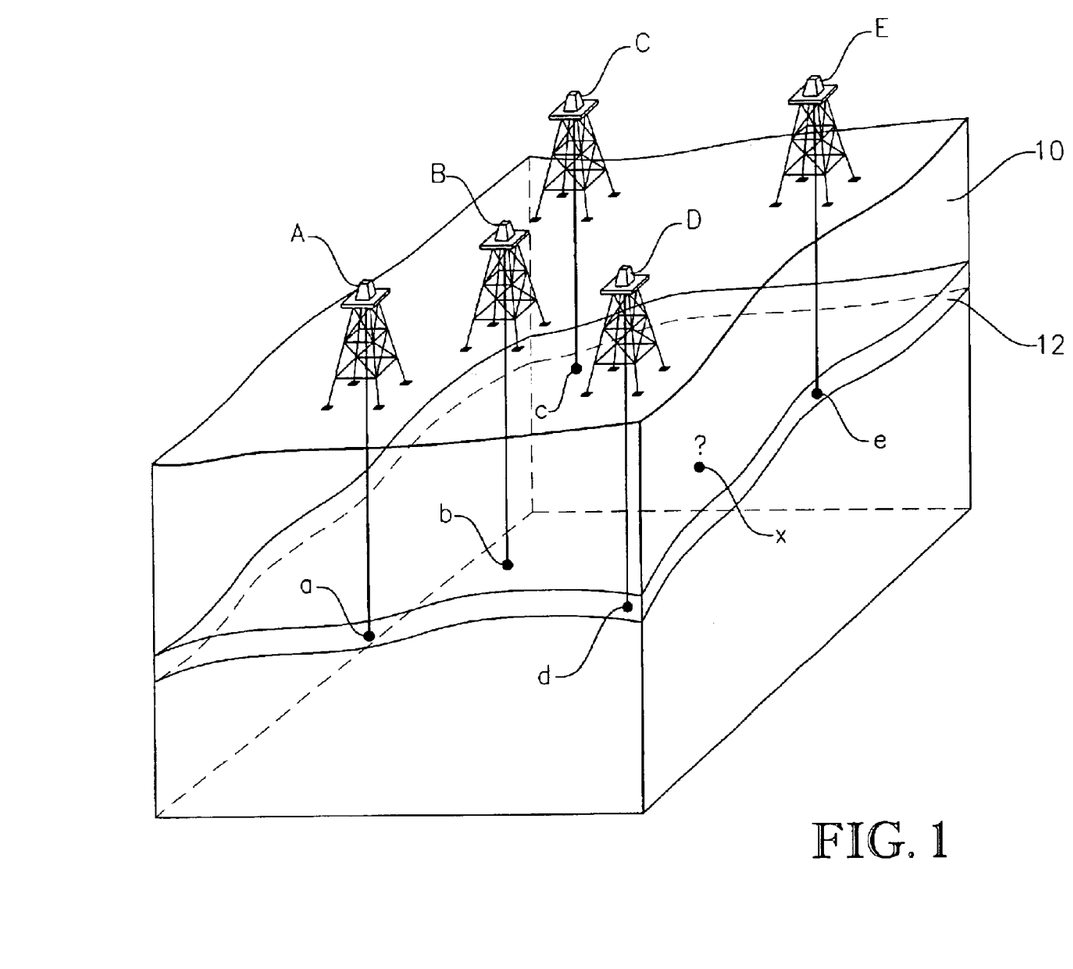
FIG. 1 is a simplified isometric view of a subterranean region of interest, particularly illustrating a plurality of wellbores extending downwardly to a reservoir in the subterranean formation.

Referring initially to FIG. 1, a simplified oil field is shown as including a plurality of wells A–E. Each well A–E extends downwardly into a subterranean formation 10 and taps into a reservoir 12 at explored subterranean locations a–e. Wells A–E can be any drilling, testing, or production facility which has penetrated subterranean formation 10 to thereby allow for actual measurements or physical samples of reservoir 12 to be extracted at explored subterranean locations a–e. Typically, the known reservoir properties at explored locations a–e are generated from conventional well log data. The known reservoir properties from explored locations a–e can be any of a variety of reservoir properties such as, for example, porosity, thickness, or fluid type.

In addition to the data gathered from wells A–E, the present invention requires that one or more seismic surveys be conducted for subterranean formation 10 and reservoir 12. The seismic survey can be conducted in accordance with conventional reflection seismic survey procedures. The data from the seismic survey is manipulated to yield a pool of unique seismic attributes. Thus, each explored location a–e has at least one known reservoir property and a plurality of unique seismic attributes associated therewith. The seismic survey also covers an unexplored subterranean location x in reservoir 12. Thus, the seismic attribute pool should also include a plurality of unique seismic attributes associated with unexplored location x. The present invention involves a residual stepwise regression method that can be used to predict a reservoir property at unexplored location x based upon the known reservoir properties at explored locations a–e, the seismic attributes at explored locations a–e, and the seismic attributes at unexplored location x.

Figure 2:
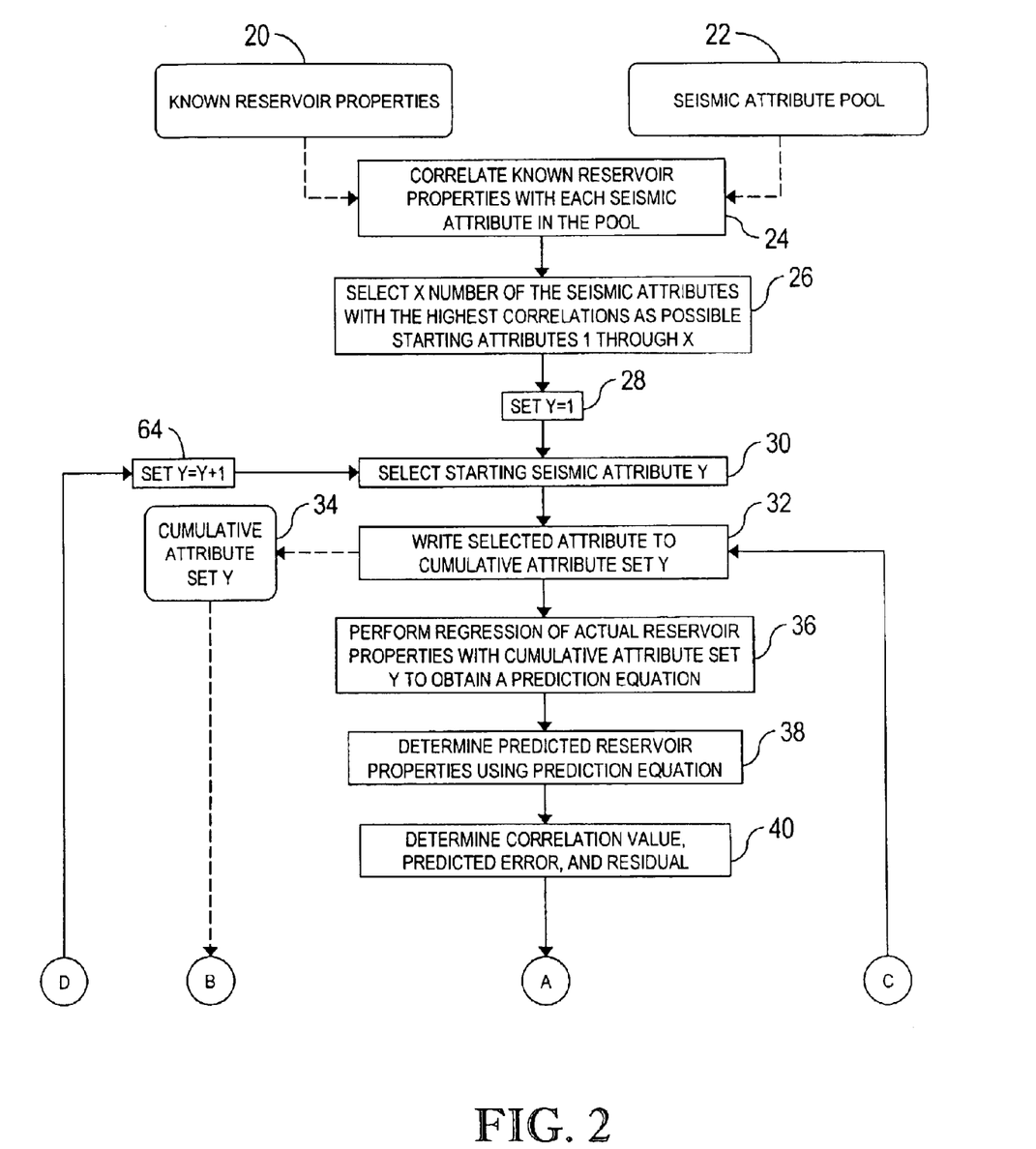
FIG. 2 is the first half of a flow chart depicting steps involved in the property prediction method of the present invention.

Referring to FIG. 2, in accordance with the present invention, known reservoir property data 20 (which can include reservoir properties from explored locations a–e in FIG. 1) and seismic attribute pool data 22 (which can include a plurality of common seismic attributes from explored locations a–e and unexplored location x in FIG. 1) are correlated in step 24. In correlation step 24, each seismic attribute at each explored location is correlated with the known reservoir property at each explored location to thereby yield a correlation coefficient. The calculation of a correlation coefficient is a common procedure known to those skilled in the art. A correlation coefficient is typically a number between −1 and 1 which measures the degree to which two variables are linearly related. If there is a perfect linear relationship with positive slope between the two variables, a correlation coefficient of 1 results. If there is a perfect linear relationship with negative slope between the two variables, a correlation coefficient of −1 results. If there is absolutely no linear relationship between the two variables, a correlation coefficient of 0 results. One common method for calculating the correlation coefficient is known as the Pearson's Product Moment method. The Pearson's Product Moment correlation coefficient is a measure of the linear association between two variables that have been measured on interval or ratio scales, such as the relationship between a person's height in inches and weight in pounds. However, the Pearson's Product Moment correlation coefficient can be misleadingly small when there is a relationship between the variables, but it is a non-linear one. Another common method for calculating the correlation coefficient is known as the Spearman Rank method. The Spearman Rank correlation coefficient is usually calculated on occasions when it is not convenient, economic, or even possible to give actual values to variables, but only to assign a rank order to instances of each variable. The Spearman Rank correlation coefficient may be a better indicator that a relationship exists between two variables when the relationship is non-linear. Various other methods suitable for calculating the correlation coefficient in step 24 (FIG. 2) are well known in the art.

Figure 4A:
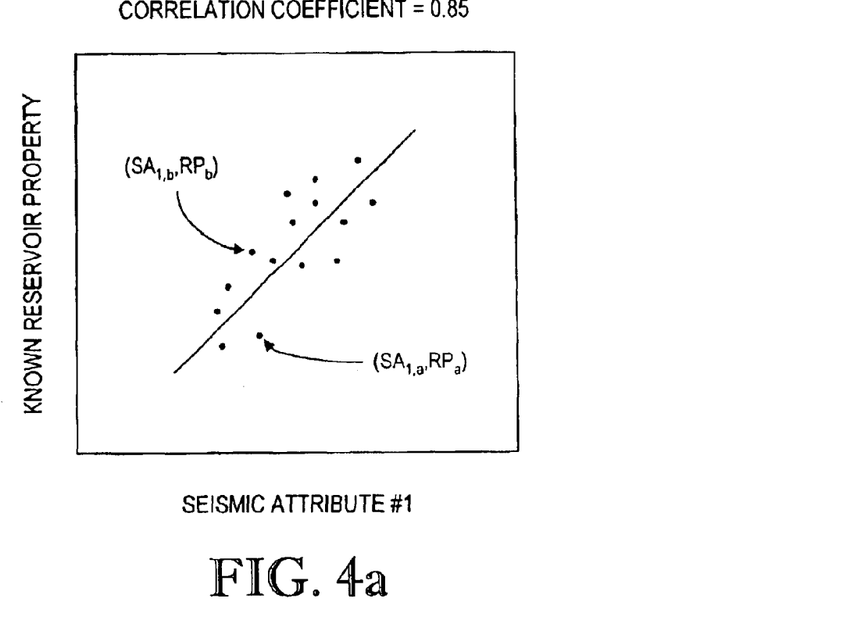
FIG. 4a is a graphical illustration of the manner in which a first one of the seismic attributes is correlated with the known reservoir properties to yield a correlation coefficient, particularly illustrating data for a first seismic attribute having a correlation coefficient of 0.85.
Figure 4B:
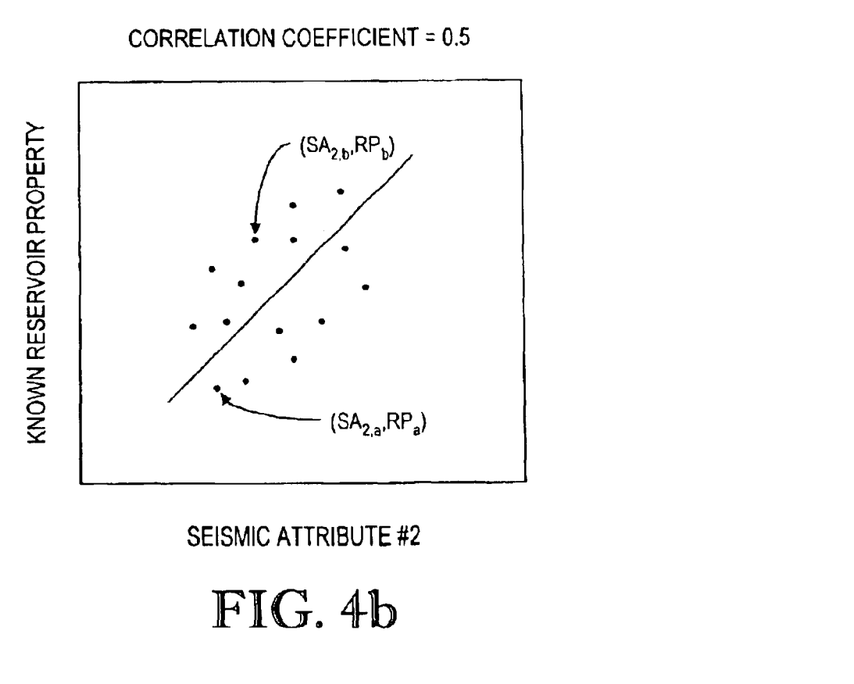
FIG. 4b is a graphical illustration similar to that of FIG. 4a, particularly illustrating data for a second seismic attribute having a correlation coefficient of 0.5.

FIGS. 4a and 4b provide a simplified graphical illustration of correlation step 24 (FIG. 2). FIG. 4a shows the correlation of a first seismic attribute (Seismic Attribute #1) and a known reservoir property at 15 explored subterranean locations. Each dot on the scatter plots of FIGS. 4a and 4b represents the seismic attribute and reservoir property at a particular explored subterranean location. For example, Seismic Attribute #1 and the reservoir property for explored subterranean location a (FIG. 1) is depicted in FIG. 4a as having coordinates ($SA_{1,a}$, $RP_a$). FIG. 4a shows that Seismic Attribute #1 has a correlation coefficient of 0.85, while FIG. 4b shows that Seismic Attribute #2 has a correlation coefficient of 0.5. Although FIGS. 4a and 4b only show correlation coefficients being calculated for Seismic Attributes #1 and #2, correlation step 24 in FIG. 2 preferably includes the calculation of a correlation coefficient for each of seismic attributes in seismic attribute pool 22.

Referring again to FIG. 2, after each of the seismic attributes has been correlated with the known reservoir properties in correlation step 24, "X" number of the seismic attributes with the highest correlation coefficients are selected as possible starting attributes in starting attribute selection step 26. Preferably, X equals 3–6, so that the seismic attributes with the 3–6 highest correlation coefficients are selected in step 26, with Possible Starting Attribute #1 having the highest correlation coefficient, Possible Starting Attribute #2 having the second highest correlation coefficient, Possible Starting Attribute #3 having the third highest correlation coefficient, and so on. In step 28, "Y" is set equal to 1. Y is used in FIGS. 2 and 3 to identify which starting attribute is under consideration. In step 30, Possible Starting Attribute #Y is selected as the starting attribute. So for the initial starting attribute Y is equal to 1, while for subsequent starting attributes Y can be any number (other than one) up to X.

In step 32, the seismic attribute selected in the previous step is written to cumulative attribute set Y 34. In the initial pass through the residual stepwise regression method outlined in steps 32–52 (FIGS. 2 and 3), cumulative attribute set Y 34 contains only the starting attribute Y. However, as other attributes are selected for consideration in the stepwise regression, these attributes are cumulatively added to attribute set Y 34 in a manner discussed in detail below. Each starting attribute will have its own unique cumulative attribute set Y 34. For example, Cumulative Attribute Set #1 will contain only the seismic attributes used in the residual stepwise regression associated with Starting Attribute #1, Cumulative Attribute Set #2 will contain only the seismic attributes used in the residual stepwise regression associated with Starting Attribute #2, and so on. After the selected attribute has been written to cumulative attribute set Y 34 in step 32, a regression step 36 is performed.

Figure 5A:
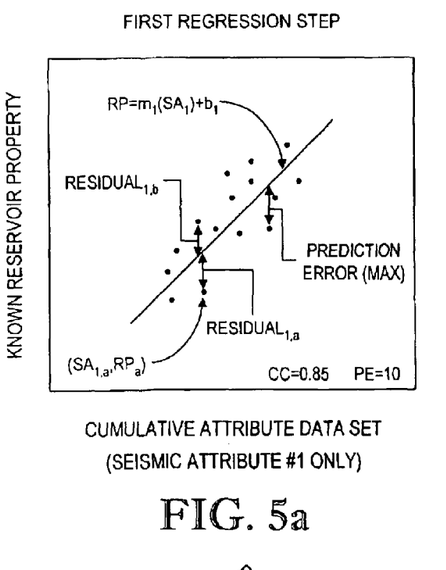
FIG. 5a is a graphical illustration of the initial regression step of the present invention, particularly illustrating the prediction equation, correlation coefficient, prediction error, and residuals associated with the regression.

In step 36, a regression of known reservoir properties 20 with the seismic attribute(s) in cumulative attribute set Y 34 is conducted. This regression yields a prediction equation that can be used to calculate a predicted reservoir property based on a given seismic attribute or attributes. FIG. 5a graphically illustrates regression step 36 (FIG. 2) for the initial regression with only one seismic attribute (i.e., Starting Attribute #1) present in cumulative attribute set Y 34. FIG. 5a shows the prediction equation expressed as follows: $RP = m_1(SA_1) + b_1$, wherein RP is the predicted reservoir property, $m_1$ is a first coefficient, $SA_1$ is a first seismic attribute, and $b_1$ is a first constant. Thus, the initial regression step utilizing only one seismic attribute results in a single-variable prediction equation. Although the prediction equation expressed in FIG. 5a is a linear equation, it is entirely within the ambit of the present invention for regression step 36 (FIG. 2) to be a non-linear regression yielding a non-linear prediction equation.

Referring again to FIG. 2, in step 38, the prediction equation is used to determine predicted reservoir properties. As shown in FIG. 5a, the predicted reservoir properties lie along the prediction line defined by the prediction equation. In step 40 (FIG. 2), the correlation value (e.g., correlation coefficient), prediction error, and residual of the data associated with the prediction equation generated in step 36 are determined. The correlation value determined in step 40 can simply be the correlation coefficient for the seismic attributes in cumulative attribute set Y 34 and the known reservoir properties. FIG. 5a shows that the data used for the initial regression step has a correlation coefficient (CC) of 0.85. As shown in FIG. 5a, the prediction error can be the maximum difference between the actual reservoir property and the predicted reservoir property determined in step 38. Alternatively, the prediction error can be the average difference between the actual reservoir property and the predicted reservoir property determined in step 38. FIG. 5a shows a maximum prediction error (PE) for the initial regression step of 10. FIG. 5a also shows that the residual calculated in step 40 is simply the difference between each known reservoir property and the corresponding predicted reservoir property. Thus, each data point on the scatter plot of FIG. 5a has a unique residual value associated therewith, while the entire scatter plot of FIG. 5a has only one prediction error and correlation value associated therewith.

Figure 3:
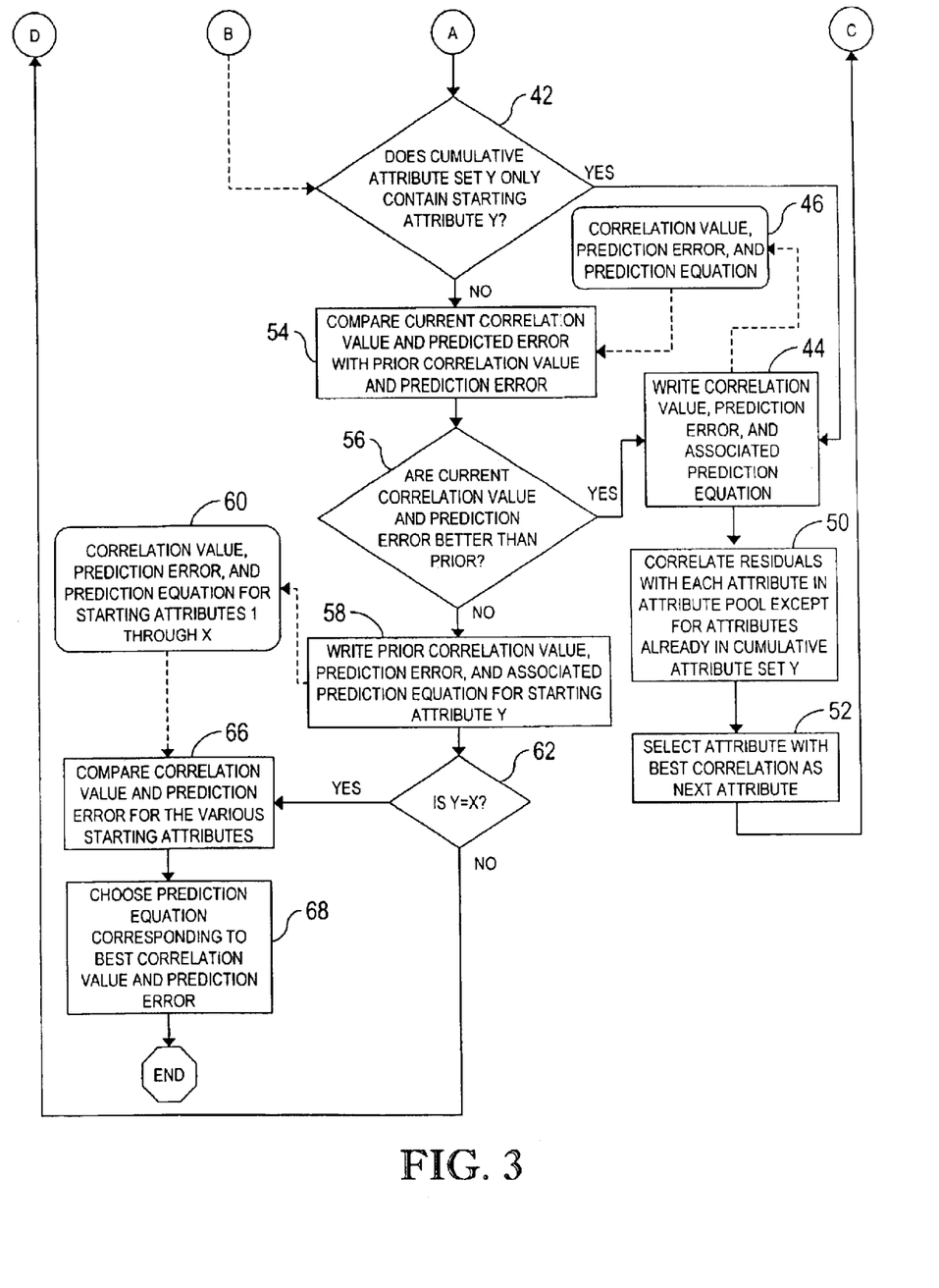
FIG. 3 is the second half of the property prediction flow chart of FIG. 2.
Figure 5B:
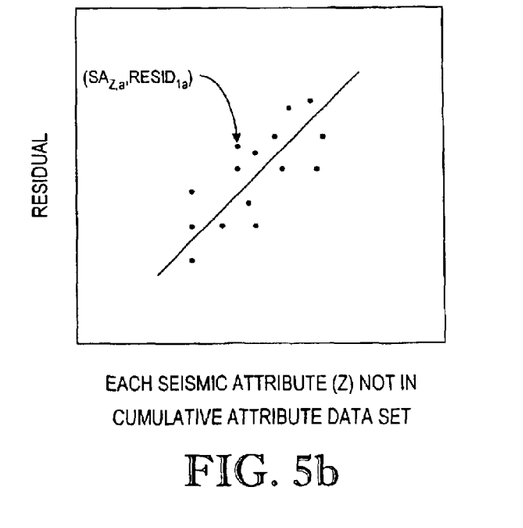
FIG. 5b is a graphical illustration of the residual correlation step of the present invention, particularly illustrating that each seismic attribute not used in a previous regression is correlated with the residual from the previous regression to thereby determine which seismic attribute should be selected for the next regression step.

Referring now to FIG. 3, in step 42, a determination is made as to whether cumulative attribute set Y 34 (FIG. 2) contains only the starting attribute Y. If cumulative attribute set Y 34 contains only starting attribute Y, step 44 writes the correlation value (from step 40), prediction error (from step 40), and associated prediction equation (from step 36) to non-cumulative data set 46. In step 50 (FIG. 3), the residuals calculated in step 40 are correlated with each attribute in seismic attribute pool 22, except for seismic attributes already written to cumulative attribute set Y 34. FIG. 5b provides a simplified graphical illustration of the correlation of one seismic attribute (Z) with the residuals from FIG. 5a. In step 52 (FIG. 3), the seismic attribute with the best correlation in step 50 is selected as the next seismic attribute. Thus, the correlation of the residual with the seismic attributes not already in the cumulative attribute data set is used to select which of the seismic attributes will be added to the next iteration of the stepwise regression. Therefore, as used herein, the term "residual stepwise regression" shall denote a stepwise regression method wherein the next variable to be used in the next regression step is selected based on the residual from the previous regression step.

Figure 5C:
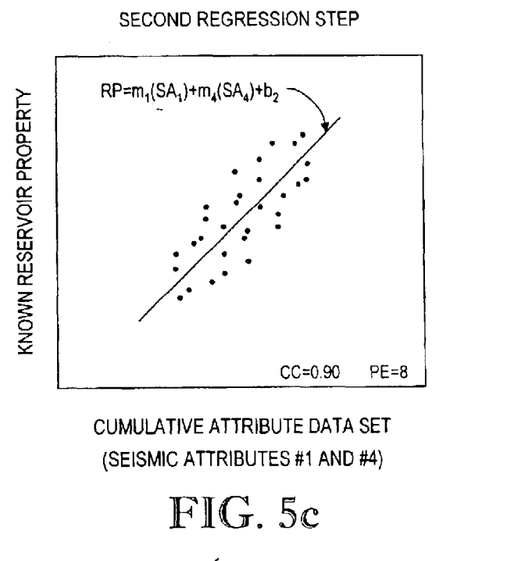
FIG. 5c is a graphical illustration of a subsequent regression step employing more than one seismic attribute in the regression, with the seismic attribute selected from the residual correlation being included in such subsequent regression step.

Referring to FIGS. 2 and 3, once the next seismic attribute has been selected in step 52 (FIG. 3), the selected seismic attribute is written to cumulative attribute set Y 34 (FIG. 2) in step 32 (FIG. 2). Steps 36, 38, and 40 (FIG. 2) are then repeated for cumulative attribute set Y 34, which now contains more than one seismic attribute. FIG. 5c provides a simplified graphical illustration of regression step 36 (FIG. 2) utilizing two seismic attributes (e.g., Seismic Attributes #1 and #4). FIG. 5c makes the assumption that Seismic Attribute #4 had the highest correlation with the residual in step 50 (FIG. 3) and was, therefore, added to cumulative attribute set Y 34. Thus, the prediction equation for the multi-variable regression performed in step 36 (FIG. 2) includes more than one seismic attribute variable. An example of such a multi-variable prediction equation is illustrated in FIG. 5c as follows: $RP = m_1(SA_1) + m_4(SA_4) + b_2$.

FIG. 5c also shows that the correlation coefficient (CC) and prediction error (PE) associated with the second regression step are 0.90 and 8, respectively.

Referring again to FIG. 3, when cumulative attribution set Y 34 (FIG. 2) contains an attribute other than just the starting attribute, the method of the present invention proceeds from step 42 to comparison step 54. In step 54, the current correlation value and prediction error determined in steps 38 and 40 (FIG. 2) are compared with the prior correlation value and prediction error written to non-cumulative data set 46 (FIG. 3) in the previous iteration of the stepwise regression. In step 56, the method asks whether the current correlation value and prediction error are better than the prior correlation value and prediction error. Typically, a "better" correlation value is represented by a correlation coefficient having a higher absolute value than the previous correlation coefficient, while a "better" prediction error is a prediction error having a smaller value than the previous prediction error. If both the current correlation value and prediction error are better than the prior correlation value and prediction error, the method proceeds from step 56 to step 44 where the current correlation value, prediction error, and associated prediction equation are written to non-cumulative data set 46, thereby replacing the previous data written to data set 46. If the current correlation value is worse than the prior correlation value or the current prediction error is worse than the prior prediction error, step 58 writes the prior correlation value, prediction error, and associated prediction equation for starting attribute Y to data set 60 and proceeds to step 62. Thus, the inventive method includes a stepwise regression that continues to add seismic attributes to the analysis until no improvement is provided by the inclusion of more seismic attributes in the regression.

In step 62 (FIG. 3), the inventive method asks whether Y is equal to X. If Y is equal to X, this means that all of the possible starting attributes (selected in step 26 of FIG. 2) have been addressed in the residual stepwise regression of steps 32–56. If Y is not equal to X, this means that one or more possible starting attributes has not yet been addressed. Thus, if Y is not equal to X, the method proceeds to step 64 (FIG. 2) where Y is set equal to Y+1, thereby selecting the next starting attribute in step 30. After the next starting attribute is selected, steps 32 through 62 are repeated until the residual stepwise regression has been performed for all of the possible starting attributes selected in step 26 (FIG. 2).

Referring again to FIG. 3, once all possible starting attributes have been addressed in residual stepwise regression steps 32–62, step 66 compares the correlation value and prediction error associated with each starting attribute from data set 60. In step 68, the prediction equation corresponding to the starting seismic attribute having the best correlation value and prediction error is selected. This optimum prediction equation is typically a multi-variable equation which can calculate a predicted reservoir property based on the value of various unique seismic attributes. Referring to FIG. 1 for example, the optimum prediction equation from step 68 (FIG. 3) can: be used to calculate a predicted reservoir property at unexplored location x based on a plurality of seismic attributes corresponding to unexplored location x.

In another embodiment of this invention, a method is provided for determining the relative significance of multiple seismic attributes used as variables in a reservoir property prediction equation. This embodiment of the invention can be applied to the reservoir property prediction equation generated from the method outlined in FIGS. 2 and 3. Alternatively, this embodiment of the invention can be employed separately from the method outlined in FIGS. 2 and 3. Generally, reservoir property prediction equations will have the following form:

$$\text{Reservoir Property} = W_1 A_1 + W_2 A_2 + W_3 A_3 + \ldots + B$$

wherein $A_i$ is a unique seismic attribute, $W_i$ is a unique coefficient for attribute i, and B is a constant. It has been discovered that the order of significance of the seismic attributes can be determined by multiplying each attribute's coefficient ($W_i$) by that attribute's standard deviation ($\sigma_i$) to give a modified coefficient ($M_i$). The attribute significance can then be determined by dividing the modified coefficient ($M_i$) by the sum of the absolute value of all of the modified coefficients. Thus, the attribute significance can be expressed as follows:

$$\text{Attribute Significance} = W_i^* \sigma_i \bigg/ \sum_{i=1}^{n} |W_i^* \sigma_i|$$

In accordance with another embodiment of the invention, the significance of seismic attributes in a prediction equation can be determined by normalizing each attribute prior to determining the prediction equation. To normalize each attribute, the mean of that attribute must be subtracted from each sample of the attribute, and this result divided by the standard deviation of the attribute. The prediction equation can then be generated using the normalized attribute in a conventional regression process or the inventive regression process described herein. The resulting prediction equation can then be analyzed for each attribute's contribution significance. This is done by dividing the coefficient of the attribute by the sum of the absolute value of all the coefficients involved in the prediction equation. A negative result means that the attribute is inversely related to the property being predicted, whereas a positive result means they are directly related. After the significance of the seismic attribute used in a reservoir property prediction equation has been determined, this information can be used to ensure that the most significant attributes are extracted from future seismic survey data.

It will be appreciated that the various steps of the method may be implemented using software, firmware, hardware, or any combination thereof. In a preferred implementation, the various steps are encoded as instructions in one or more routines, subroutines, or code segments of a computer program stored on a memory media and executable by a computing device. The computing device may take the form of any conventional personal computer, whether desktop or portable in nature, or any of a variety of smaller hand-held devices having sufficient processing and other computing resources to execute the computer program in the manner desired. In an equally preferred alternative implementation, the various steps are implemented in the electronic logic hardware of a substantially electronic device.

The preferred forms of the invention described above are to be used as illustration only and should not be used in a limiting sense to interpret the scope of the present invention. Obvious modifications to the exemplary embodiments, set forth above, could be readily made by those skilled in the art without departing from the spirit of the present invention.

The inventor hereby states his intent to rely on the doctrine of equivalents to determine and assess the reasonably fair scope of the present invention as it pertains to any apparatus not materially departing from but outside the literal scope of the invention as set forth in the following claims.

What is claimed is:

1. A method of predicting a reservoir property at an unexplored subterranean location based on a seismic attribute pool generated from a seismic survey and known reservoir properties at explored subterranean locations, said seismic attribute pool including a plurality of common seismic attributes for each explored and unexplored location, said method comprising the steps of:

(a) performing a first regression of the known reservoir properties and a first one of the common seismic attributes at the explored locations, said regression yielding a first prediction equation for calculating a first predicted reservoir property;

(b) calculating first residuals for the known reservoir properties and corresponding first predicted reservoir properties generated with the first prediction equation;

(c) correlating the first residuals with the common seismic attributes not used in the regression of step (a); and (d) selecting the common seismic attribute with the highest correlation from step (c) as a second one of the common seismic attributes.

2. The method of claim 1; and (e) performing a second regression of the known reservoir properties and the first one and second one of the common seismic attributes at a plurality of the explored locations, said second regression yielding a second prediction equation for calculating a second predicted reservoir property.

3. The method of claim 2; and (f) determining a first correlation value and a first prediction error for the first regression; and (g) determining a second correlation value and a second prediction error for the second regression.

4. The method of claim 3; and (h) comparing the second correlation value and second prediction error with the first correlation value and first prediction error to determine whether the second prediction equation provides a more accurate property prediction than the first prediction equation.

5. The method of claim 4; and (i) using the first prediction equation to calculate the reservoir property at the unexplored subterranean location if the second prediction equation does not provide a more accurate property prediction than the first prediction equation.

6. The method of claim 2; and (j) calculating second residuals for the known reservoir properties and corresponding second predicted reservoir properties generated with the second prediction equation.

7. The method of claim 6; and (k) correlating the second residuals with the common seismic attributes not used in the second regression.

8. The method of claim 7; and (l) selecting the common seismic attribute with the highest correlation from step (k) as a third one of the seismic attributes.

9. The method of claim 8; and (m) performing a third regression of the known reservoir properties and the first one, second one, and third one of the common seismic attributes at a plurality of the explored locations, said third regression yielding a third prediction equation for calculating a third predicted reservoir property.

10. The method of claim 1; and (n) prior to step (a), correlating the known reservoir properties with each of the common seismic attributes.

11. The method of claim 10; and (o) selecting the first one of the common seismic attributes based on the correlation of step (n).

12. The method of claim 11, said first one of the common seismic attributes having the best correlation from step (n).

13. The method of claim 1; and (p) selecting a common seismic attribute different from the first one of the common seismic attributes; and (q) repeating steps (a)–(d) using the common seismic attribute selected in step (p) as the first one of the common seismic attributes.

14. A stepwise regression method for predicting a reservoir property at an unexplored subterranean location based on a seismic attribute pool generated from a seismic survey and known reservoir properties at explored subterranean locations, said seismic attribute pool including a plurality of common seismic attributes for each explored and unexplored location, said method comprising the steps of:

(a) selecting one of the common seismic attributes as a current starting attribute and proceeding to step (b);

(b) adding the selected seismic attribute from the previous step to a cumulative attribute set and proceeding to step (c); (c) performing a regression of the known reservoir properties and the seismic attribute or attributes in the cumulative attribute set, to thereby yield a current prediction equation for calculating a predicted reservoir property and proceeding to step (d);

(d) calculating a current correlation value, a current prediction error, and current residuals for the known reservoir properties and corresponding predicted reservoir properties generated with the current prediction equation and proceeding to step (e);

(e) proceeding to step (g) if the selected seismic attribute from step (b) is the starting seismic attribute, otherwise comparing the current correlation value and prediction error to a prior correlation value and prediction error and proceeding to step (f);

(f) proceeding to step (j) if the current correlation value or prediction error is worse than the prior correlation value and prediction error, otherwise proceeding to step (g);

(g) correlating the residuals from step (d) with each of the common seismic attributes not currently in the cumulative attribute data set and proceeding to step (h);

(h) designating the current prediction equation, correlation value, and prediction error as a prior prediction equation, correlation value, and prediction error and proceeding to step (i);

(i) selecting the seismic attribute with the highest correlation from step (g) as a next seismic attribute and returning to step (b); and (j) designating the prior prediction equation as an optimum prediction equation for the current starting attribute.

15. The stepwise regression method of claim 14; and (k) subsequent to step (j), designating one of the common seismic attributes not selected in step (a) as the current starting attribute and proceeding to step (b).

16. The stepwise regression method of claim 15, step (a) including the substep of:

(a1) correlating the known reservoir properties with the common seismic attributes.

17. The stepwise regression method of claim 16, step (a) including the substep of:

(a2) designating several of the common seismic attributes as possible starting attributes based on the correlation of step (a1).

18. The stepwise regression method of claim 17, step (a) including the substep of:

(a3) selecting the possible starting attribute with the highest correlation from step (a1) as the current starting attribute.

19. The stepwise regression method of claim 18, step (k) including the substep of:

(k1) selecting the possible starting attribute with the second highest correlation from step (a) as the current starting attribute.

20. A method of predicting a reservoir property at an unexplored subterranean location based on a seismic attribute pool generated from a seismic survey and known reservoir properties at explored subterranean locations, said seismic attribute pool including a plurality of common seismic attributes for each explored and unexplored location, said method comprising the steps of:

(a) correlating the known reservoir properties with the common seismic attributes to yield a correlation value that is proportional to the degree of correlation between the known reservoir properties and the common seismic attributes;

(b) selecting several of the common seismic attributes with the highest correlation values as possible starting attributes;

(c) determining a prediction equation for each possible starting attribute, each of said prediction equations having a correlation value and prediction error associated therewith; and (d) selecting an optimum prediction equation from the prediction equations determined in step (c) based on the correlation value and prediction error associated with the prediction equations determined in step (c).

21. The method of claim 20, step (b) including selecting 3 to 6 of the common seismic attributes with the highest correlation values as possible starting attributes.

22. The method of claim 20, said prediction equation being operable to calculate a predicted reservoir property based on a plurality of the common seismic attributes.

23. The method of claim 22, step (c) including using stepwise residual regression to determine the prediction equation.

24. The method of claim 23, step (c) including calculating residuals for each regression of the stepwise regression, step (c) including correlating the residuals with the common seismic attributes not used in a previous regression.

25. The method of claim 24, step (c) including using the seismic attribute that best correlates with the residuals as the next seismic attribute to be used in a subsequent regression.

26. The method of claim 23, step (d) including comparing the correlation value and prediction error of a prior regression with the correlation value and prediction error of a current regression to determine whether to continue with another regression.

27. The method of claim 26, step (d) including designating the current regression as a last regression when the correlation value or prediction error of the current regression do not improve upon the correlation value and prediction error of the prior regression, said optimum prediction equation being generated from the regression conducted just prior to the last regression.

28. A method comprising the steps of:

(a) extracting actual well data from a plurality of subterranean well locations, said well data including a target reservoir property for each well location;

(b) generating seismic data from a seismic survey of a subterranean region of interest that includes the subterranean well locations, said seismic data including a plurality of seismic attributes for each well location;

(c) selecting an unexplored location in the subterranean region of interest, said unexplored location being spaced from the well locations;

(d) correlating the target reservoir properties with the seismic attributes to yield a correlation value that is proportional to the degree of correlation between the target reservoir properties and the seismic attributes;

(e) selecting several of the seismic attributes with the highest correlation values as possible starting attributes;

(f) determining a prediction equation for each possible starting attribute, each of said prediction equations having a correlation value and prediction error associated therewith;

(g) selecting an optimum prediction equation from the prediction equations determined in step (f) based on the correlation value and prediction error of the prediction equations; and (h) using the optimum prediction equation to calculate a predicted reservoir property at the unexplored location based on a plurality of the seismic attributes at the unexplored location.

29. The method of claim 28, step (f) including using stepwise residual regression to determine the prediction equation for each starting attribute.

30. The method of claim 29, said stepwise regression starting with a regression of one of the possible starting attributes and then adding additional seismic attributes for subsequent regressions.

31. The method of claim 30, step (f) including selecting the additional seismic attributes based on a correlation of a previous regression's residuals and the seismic attributes not used in the previous regression.

32. A method of determining the relative significance of multiple seismic attributes used to predict a reservoir property, said method comprising the steps of:

(a) normalizing each of the seismic attributes;

(b) generating a reservoir property prediction equation via regression of the multiple seismic attributes and actual reservoir properties, said prediction equation being operable to calculate a predicted reservoir property based on the value of the seismic attributes plugged into the prediction equation, said prediction equation including a coefficient associated with each normalized seismic attribute;

(c) dividing the coefficient for each normalized seismic attribute by the sum of the absolute values of all the coefficients used in the prediction equation.

33. The method of claim 32, step (a) including calculating a mean value and a standard deviation for each seismic attribute.

34. The method of claim 33, step (a) including subtracting the mean value for each seismic attribute from each sample for that seismic attribute to obtain a mean difference.

35. The method of claim 34, step (a) including dividing each mean difference for each seismic attribute by the corresponding standard deviation.

36. A method of determining the relative significance of multiple seismic attributes used as variables in a reservoir property prediction equation, said prediction equation being operable to calculate a predicted reservoir property based on the values of the seismic attributes plugged into the prediction equation, said prediction equation including a coefficient associated with each seismic attribute, said method comprising the steps of:

(a) determining a standard deviation for each seismic attribute used in the prediction equation;

(b) multiplying the standard deviation for each seismic attribute by the coefficient for that respective seismic attribute to yield a modified coefficient for each seismic attribute; and (c) dividing the modified coefficient for each seismic attribute by the sum of the absolute values of all the modified coefficients for all the seismic attributes used in the prediction equation.

37. A computer program stored on a computer-readable medium for directing operation of a computer to predict a reservoir property at an unexplored subterranean location based on a seismic attribute pool generated from a seismic survey and known reservoir properties at explored subterranean locations, said seismic attribute pool including a plurality of common seismic attributes for each explored and unexplored location, said computer program comprising:

(a) a code segment operable to perform a regression of the known reservoir properties and a first one of the common seismic attributes at the explored locations, said regression yielding a prediction equation for calculating a predicted reservoir property;

(b) a code segment operable to calculate residuals for the known reservoir properties and corresponding predicted reservoir properties generated with the prediction equation;

(c) a code segment operable to correlate the residuals with the common seismic attributes not used in the regression; and (d) a code segment operable to select the common seismic attribute with the highest correlation from the correlation step as a second one of the common seismic attributes.

38. A computer program stored on a computer-readable medium for directing operation of a computer to predict a reservoir property at an unexplored subterranean location based on a seismic attribute pool generated from a seismic survey and known reservoir properties at explored subterranean locations, said seismic attribute pool including a plurality of common seismic attributes for each explored and unexplored location, said computer program comprising:

(a) a code segment operable to select one of the common seismic attributes as a current starting attribute;

(b) a code segment operable to add the seismic attribute selected by code segment (a) to a cumulative attribute set;

(c) a code segment operable to perform a regression of the known reservoir properties and the seismic attribute or attributes in the cumulative attribute set, to thereby yield a current prediction equation for calculating a predicted reservoir;

(d) a code segment for calculating a current correlation value, a current prediction error, and current residuals for the known reservoir properties and corresponding predicted reservoir properties generated with the current prediction equation;

(e) a code segment operable to initiate code segment (g) if the selected seismic attribute employed in code segment (b) is the starting seismic attribute, otherwise to compare the current correlation value and prediction error to a prior correlation value and prediction error;

(f) a code segment operable to initiate code segment (j) if the current correlation value or prediction error is worse than the prior correlation value and prediction error;

(g) a code segment operable to correlate the residuals calculated by code segment (d) with each of the common seismic attributes not currently in the cumulative attribute data set;

(h) a code segment operable to designate the current prediction equation correlation value, and prediction error as a prior prediction equation, correlation value, and prediction error;

(i) a code segment operable to select the seismic attribute with the highest correlation generated by code segment (g) as a next seismic attribute and initiate code segment (b); and (j) a code segment operable to designate the prior prediction equation as an optimum prediction equation for the current starting attribute.

39. A computer program stored on a computer-readable medium for directing operation of a computer to predict a reservoir property at an unexplored subterranean location based on a seismic attribute pool generated from a seismic survey and known reservoir properties at explored subterranean locations, said seismic attribute pool including a plurality of common seismic attributes for each explored and unexplored location, said computer program comprising:

(a) a code segment operable to correlate the known reservoir properties with the common seismic attributes to yield a correlation value that is proportional to the degree of correlation between the known reservoir properties and the common seismic attributes;

(b) a code segment operable to select several of the common seismic attributes with the highest correlation values as possible starting attributes;

(c) a code segment operable to determine a prediction equation for each possible starting attribute, each of said prediction equations having a correlation value and prediction error associated therewith; and (d) a code segment operable to select an optimum prediction equation from the prediction equations determined by code segment (c) based on the correlation value and prediction error associated with the prediction equations determined by code segment (c).

40. A computer program stored on a computer-readable medium for directing operation of a computer to determine the relative significance of multiple seismic attributes used to predict a reservoir property, said computer program comprising:

(a) a code segment operable to normalize each of the seismic attributes;

(b) a code segment operable to generate a reservoir property prediction equation via regression of the multiple seismic attributes and actual reservoir properties, said prediction equation being operable to calculate a predicted reservoir property based on the value of the seismic attributes plugged into the prediction equation, said prediction equation including a coefficient associated with each normalized seismic attribute;

(c) a code segment for dividing the coefficient for each normalized seismic attribute by the sum of the absolute values of all the coefficients used in the prediction equation.

41. A computer program stored on a computer-readable medium for directing operation of a computer to determine the relative significance of multiple seismic attributes used as variables in a reservoir property prediction equation, said prediction equation being operable to calculate a predicted reservoir property based on the values of the seismic attributes plugged into the prediction equation, said prediction equation including a coefficient associated with each seismic attribute, said computer program comprising;

(a) a code segment operable to determine a standard deviation for each seismic attribute used in the prediction equation;

(b) a code segment operable to multiply the standard deviation for each seismic attribute by the coefficient for that respective seismic attribute to yield a modified coefficient for each seismic attribute; and (c) a code segment operable to divide the modified coefficient for each seismic attribute by the sum of the absolute values of all the modified coefficients for all the seismic attributes used in the prediction equation.

* * * * *